June 3, 1941.　　　　R. W. JOHNSON　　　　2,244,161
INTERCHANGEABLE METERING VALVE CONTROL
Filed June 23, 1938　　　　2 Sheets-Sheet 1

INVENTOR
ROY W. JOHNSON

BY John W. Michael

ATTORNEY

June 3, 1941.　　R. W. JOHNSON　　2,244,161
INTERCHANGEABLE METERING VALVE CONTROL
Filed June 23, 1938　　2 Sheets-Sheet 2
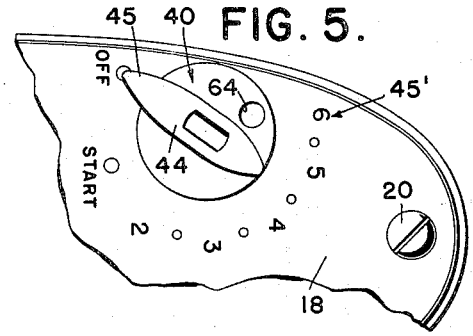
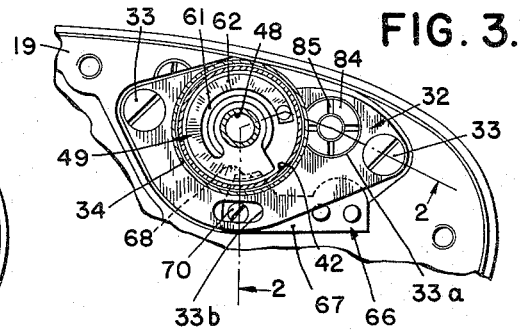
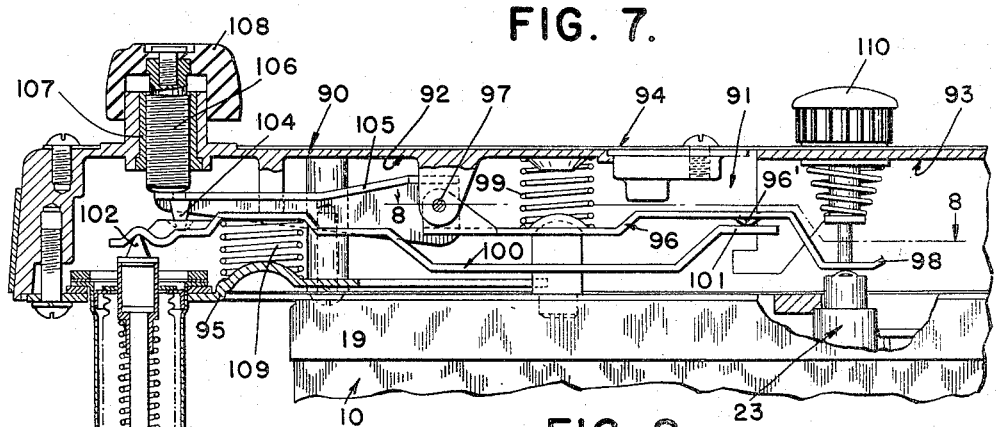
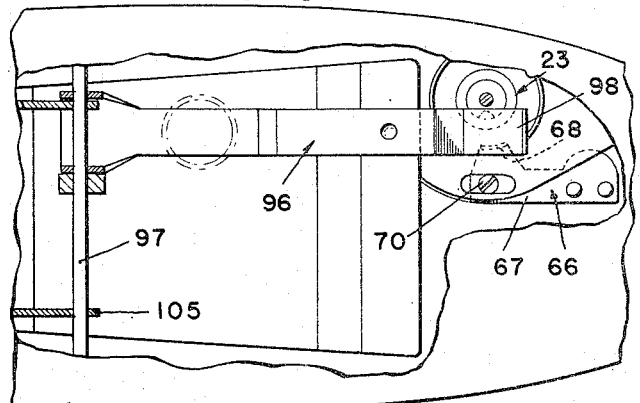
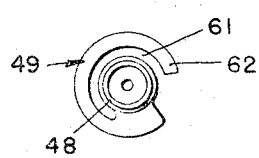
INVENTOR
ROY W. JOHNSON
BY John W. Michael
ATTORNEY Patented June 3, 1941

2,244,161

UNITED STATES PATENT OFFICE 2,244,161

INTERCHANGEABLE METERING VALVE CONTROL

Roy W. Johnson, Milwaukee, Wis.

Application June 23, 1938, Serial No. 215,336

22 Claims. (Cl. 251—132)

This invention relates to an improvement in control devices of the type incorporated in the fuel line between a reservoir and a burner where the liquid fuel is fed by gravity to the burner.

Devices of this character usually consist of a casing having a liquid supply chamber provided with a fuel inlet which is connected up to the reservoir. A float controlled valve regulates flow of the fuel in through the inlet to maintain a constant level in the liquid supply chamber. This chamber is provided with an outlet connected up to the burner. A metering valve which may be either manually or thermostatically controlled regulates the flow of oil or liquid fuel through the outlet to the burner.

One of the principal objects of the invention is to provide a control device of this character with an improved type of metering valve action and control whereby to insure uniform predetermined variations in oil flow over the entire operating range of the valve and hence bring about a smooth metering action and avoid sudden increase in oil flow. High and low fire adjustments are facilitated and the safety and reliability of the device are enhanced. The high fire adjustment is such as to eliminate overrating of the burner while the low fire adjustment reduces carbonization to a minimum by providing a definite, clean low fire.

Another object of the invention is to facilitate the conversion of the device from a manually controlled to a thermostatically controlled unit.

Another object of the invention is to provide an oil control device of this character which is simple and durable in its construction, compactly and closely organized, reliable and efficient in operation, and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 3 is a fragmentary view in horizontal cross section taken on line 3—3 of Figure 2;

Figure 5 is a fragmentary view in top plan showing the portion of the casing with which the control knob is associated;

Figure 6 is a detail view of the tubular structure and cam prior to its association with the control knob;

Figure 7 is a fragmentary view in side elevation and partly in longitudinal vertical cross section showing the oil control device equipped with a thermostatic control; and Figure 8 is a fragmentary view in horizontal cross section taken on line 8—8 of Figure 7.

Figure 1:
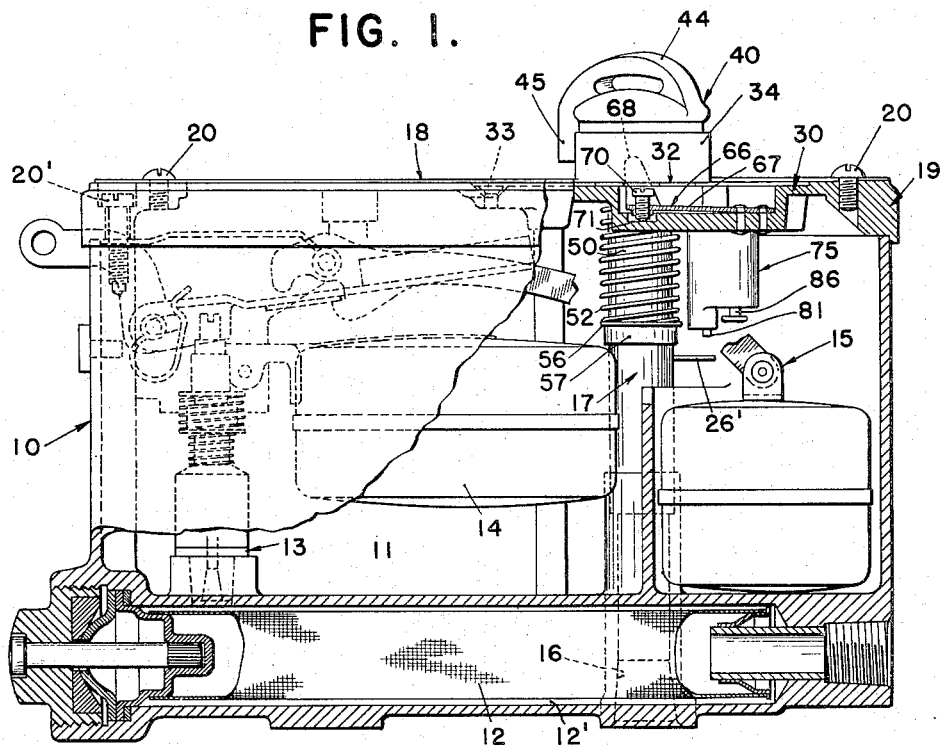
Figure 1 is a view partly in side elevation and partly in longitudinal vertical cross section showing an oil control device embodying the present invention and equipped for manual control.

Referring to the drawings and more particularly to Figure 1, it will be seen that the control device comprises a casing designated generally at 10 and having a main liquid supply chamber 11 therein. Liquid fuel is supplied through a strainer 12 provided in an inlet passageway 12' to an inlet valve 13 controlled by a main float 14 so that a constant level of liquid is maintained in a supply chamber 11. A safety shut-off mechanism designated generally at 15 is combined with the means for maintaining a level of liquid in the main supply chamber 11 in the manner fully described and claimed in my Patent 2,068,138 granted January 19, 1937.

The liquid flows out of the main supply chamber 11 through one or more outlet passages 16 which are connected up to the burner (not shown). As the outlet passages and their associated mechanism are identical, a description of one will serve.

A tubular valve guide 17, which may be constituted of a brass tube, has its lower end press fitted in or otherwise suitably secured to the upper portion of the outlet passage 16, the valve guide extending vertically in the casing and terminating a short distance below the removable cover plate 18 of the casing. The cover plate 18 is releasably fastened by suitable screws 20 to a marginal cover frame 19 which is in turn releasably fastened by screws 20' to the upper margin of the casing 10. A valve seat 21 is machined in and constituted as an integral part of the tube 17. Above the valve seat the tube 17 is provided with a lateral opening 22 to provide for communication between the interior of the guide tube and the liquid supply chamber 11.

A metering valve designated generally at 23 is fitted in the guide tube and has a reduced lower end 23' provided with a metering slot 23a. The reduced lower end portion 23' is a sliding fit in a correspondingly formed portion 24 of the tube 17, the tube portion 24 having a reduced internal diameter and functioning as a guide for the lower end of the valve. Just above the reduced portion 23' the metering valve is formed with a beveled portion 25 which coacts with the valve seat to shut off the flow in the fully closed or shut off position of the valve.

The upper portion of the tubular guide 17 is provided with a vertical guide slot 26 in which a guide pin 26' secured to the metering valve stem and projecting laterally therefrom slides, whereby the body portion of the valve as well as the lower end is positively guided.

The metering valve is biased to open position by means of an expansible coil spring 27 surrounding a portion of its stem and interposed between an internal shoulder 28 on the valve tube 17 and a collar or flange 29 fixed on the metering valve stem adjacent its upper end.

The cover frame 19 has an integral transverse web 30 provided with an opening 31 through which the upper end of the metering valve stem projects. A sheet metal bracket plate 32 is seated in a recess provided therefor in the web 30 and is releasably secured in position by two screws 33. The bracket plate 32 is provided with a flanged opening which registers with the opening of the web, the flange of the opening being designated at 34. An annular spring seat 35 which may also be stamped from sheet metal, is interfitted with and secured to the flanged opening of the bracket plate 32 and its horizontal portion is provided with a flanged opening 36 somewhat smaller than but coaxial with the flanged opening of the bracket plate. These parts provide the mounting and partial enclosure for the assembly proposed by the present invention for manually adjusting the valve in instances where a manually operable control is desirable.

Figure 2:
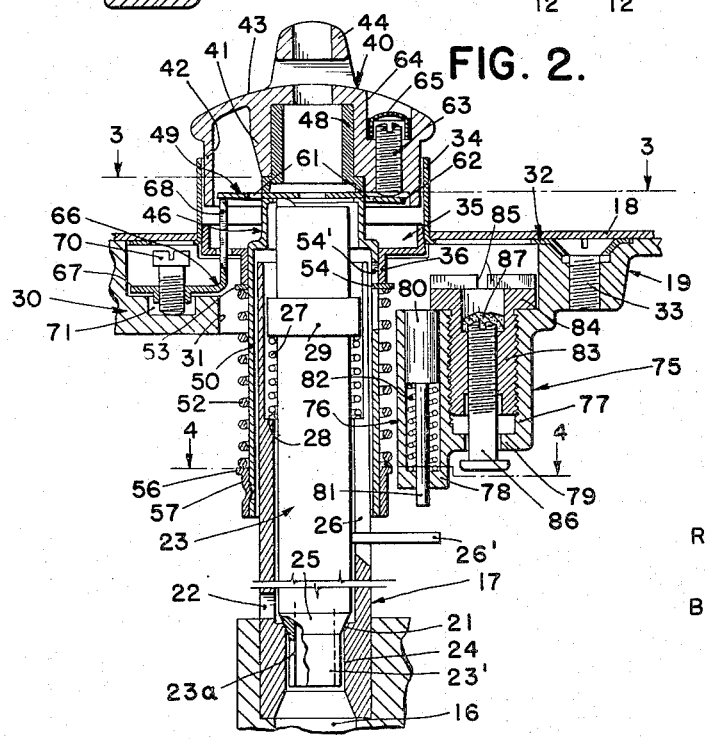
Figure 2 is a fragmentary view in transverse vertical cross section taken on line 2—2 of Figure 3.
Figure 4:
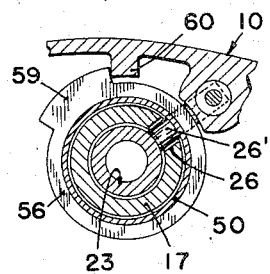
Figure 4 is a similar view taken on line 4—4 of Figure 2.

The manually operable control comprises a knob or handle designated generally at 40 and loosely and rotatably interfitted with the flange 34. The knob 40, which may be of one piece, includes inner and outer cylindrical portions 41 and 42 connected at their upper ends by a domed top portion 43. A rib-like finger grip 44 extends across the domed top portion and may project beyond one side of the knob as at 45 to provide a pointer which travels across a suitable dial 45' on the cover plate 18 of the device to indicate the position of the valve. A sleeve and cam assembly designated generally at 46 is interconnected with the knob 40 and extends downwardly therefrom. This assembly includes a short upper sleeve 48 which is a press fit in, or otherwise suitably secured to the inner cylindrical section 41 of the knob. The cam of the assembly which is constituted of a sheet metal plate, is designated generally at 49 and is interposed between the short upper sleeve 48 and a longer and larger lower sleeve 50 and is welded to both of these sleeves so that the two sleeves and the cam are all rigidly interconnected together as well as rigidly interconnected with the control knob. The lower and longer sleeve 50 loosely telescopes over the guide tube 17 and is a rotating fit in the flange 36 of the spring seat 35. To adapt them to coact with their associated parts the sleeves 48 and 50 are of the stepped formation shown in Figure 2.

The knob, cam and sleeve assembly are biased downwardly by means of a coil spring 52 which surrounds the lower sleeve 50. The upper end of this spring 52 abuts a washer 53 which in turn abuts the flange 36 of the spring seat 35. The washer 53 is held against rotation by means of a lug 54 integral therewith and projecting inwardly therefrom and into a longitudinal key slot 54' formed in the sleeve 50. The lower end of the spring abuts the flanged upper end 56 of a sheet metal band 57 which is fitted over and suitably secured to the lower end of the sleeve 50. The spring 52 in the assembly is under suitable compression to force the control knob, sleeve, and cam assembly downwardly with the proper pressure.

An arcuate extension 59 on the flange 56 of the band 57 is provided and cooperates with an inwardly directed stop lug 60 on the casing to limit the extent to which the control knob, cam, and sleeve assembly may be rotated in either direction.

As previously indicated, the cam is made up of a plate of sheet metal, preferably of hardened steel, which has its central portion welded to the two sleeves and which is provided, as illustrated in detail in Figure 6, with an arcuate slot 61 to provide a curved strip-like peripheral portion 62 which is bent and set to give the cam the desired shape or contour and which, in addition, may be flexed with respect to the plane of the sheet of metal making up the cam to the extent necessary to give the under surface of the strip 62 constituting the active face of the cam the desired rise or throw. By constituting the active face of the cam in this way its rise may be adjusted. This is a desirable feature to compensate for variations in the width of the metering slots. Adjustment of the curved strip 62 of the cam is effected by means of an adjusting screw 63 threadedly interconnected with the control knob and having its lower end rounded and bearing on the upper face of the strip 62 adjacent its free end. The upper end of the screw 63 projects into a recess 64 provided in the top of the control knob and such end portion of the screw has a cross slot to facilitate its manipulation by a screw driver or the like. This screw is adjusted at the factory, and to prevent tampering with it in the field its upper end may be enclosed by a sheet metal cap 65 which is a driving fit in the recess 64.

The underside or active face of the strip 62 of the cam rides on an adjustable abutment 66 provided therefor and supported on the cross web 30 of the cover frame. This adjustable abutment comprises a strip of sheet metal designated at 67 riveted at one end to the cross web and provided at its opposite end with an upstanding lug 68 on which the cam rides. The strip is made of resilient metal and may be flexed to cause the lug to shift vertically. For this purpose, the strip 67, at a point adjacent its lug 68, has an extruded and internally threaded opening with which an adjusting screw 70 is engaged. The lower end of the adjusting screw bears on the floor of a recess 71 provided therefor in the cross web. This construction provides the low fire adjustment.

For the purpose of providing a high fire adjustment where changes in oil flow are desired in the field due to changes in oil viscosity or draft and yet preclude overrating of the burner, the cross web 30 is provided adjacent the metering valve assembly with a downwardly extending enlargement 75 provided with vertically extending parallel cylinder or socket-like structures 76 and 77, the bore of cylinder 76 being smooth while that of cylinder 77 is internally threaded. Both of these cylinders 76 and 77 are open at their upper ends but have centrally apertured lower end walls designated at 78 and 79. A plunger 80 is slidably mounted in the cylinder 76 and has a stop pin 81 fixed thereto and projecting down through a central aperture of the end wall 78 of the cylinder 76, the parts being so arranged that the lower end of the stop pin 81 lies in the path of travel of the laterally projecting guide pin 26' of the metering valve. A spring 82 encircles the stop pin 81 and is interposed between the lower end of the plunger and the lower end wall 78 of the cylinder 76, the spring biasing the plunger and stop pin to move upwardly. The adjustment or position of the plunger 80 and stop pin 81 is determined by means of a flanged stop sleeve 83 which is externally threaded and interengaged with the internal threads of the cylinder 77. The upper end of this sleeve 83 has an annular flange 84 which overlaps the upper end of the plunger 80. Since the spring 82 maintains the plunger engaged with the flange 84 the position of the plunger and of its stop pin is accurately controlled by adjusting this stop sleeve 83. To facilitate adjustment of the stop sleeve 83 its upper face is provided with cross slots 85 to adapt it for coaction with a screw driver or the like.

The extent to which the sleeve 83 may be moved upwardly is limited by means of a stop screw 86 whose external threads are interengaged with the internal threads of the stop sleeve. The screw 86 has its lower end portion projecting through the central aperture of the lower end wall 79 of the cylinder 77 and its lower end is headed so as to overlap the margins of the central aperture of this end wall 79 and hence limit the upward movement of the screw 86. The screw 86 and stop sleeve 83 are relatively adjustable and for this purpose the upper end of the screw 86 is provided with a cross slot to adapt it to coact with a screw driver, access to the cross slot being had at the factory through the upper end of the bore through the stop sleeve.

After the parts have been assembled at the factory and calibrated, a drop of solder, designated at 87, is placed in the upper end of the bore of the sleeve 83 and over the upper end of the stop screw 86 so as to preclude relative adjustment of the stop screw 86 and stop sleeve 83 and thereby prevent overrating of the burner, although affording through the limited adjustment of the stop sleeve 83 adequate high fire adjustment to take care of changes in oil flow that may be necessary to compensate for changes in oil viscosity or draft encountered in the field.

As illustrated in Figure 3, the bracket plate 32 is provided with openings 33a and 33b which overlie the cross slotted flange 84 of the adjusting sleeve 83 and the low fire adjusting screw 70 respectively. Hence, by removing the cover plate 18, access may readily be had to both the high and low fire adjustments.

The construction as thus far described is of the manually operated control type but it is such as to lend itself readily to conversion in the field to a thermostatically operated unit.

The thermostatically operated control means adapted for employment in lieu of the manually operable control described is illustrated in Figures 7 and 8.

The thermostatically operated control means or control unit is designated generally at 90 and comprises a flat, elongated casing having a peripheral wall 91 provided adjacent its top with integral cross webs 92 and 93, the enclosure at the top being completed by a removable cover plate 94. The casing of the control unit rests flatly on top of the cover frame 19, the cover plate 18 having been removed and is so positioned lengthwise of the cover frame that one end of the control unit overhangs the cover frame 19 and the casing of the device. The overhanging portion of the control unit is provided with a transversely extending wall 95 to close the bottom of this portion of the control unit.

Prior to assembling the thermostatically controlled unit with the device not only the name plate 18 but also the manual control assembly is removed. This may be conveniently accomplished by backing off the screws 20 which hold the name plate in position and backing off the two screws 33 which secure the bracket plate 32 in place. The control knob 40, its bracket plate 32, the cam 49, the sleeve arrangement 46, the spring seat 35, washer 53, spring 52 and band 57 may be then readily lifted off or removed as a unit and the thermostatic control unit put into position and secured in such position by suitable screws.

Within the casing of the unit 90 a valve operating lever 96 is provided and has one end pivotally supported on a fulcrum pin 97 suitably secured in position on the casing and its other end, designated at 98, downwardly offset and positioned to overlap and be engageable with a portion of the upper end of the valve 23 and also the abutment lug 68 of low fire abutment 66. A spring 99 interposed between the cross piece 92 and lever 96 biases the lever 96 to swing in such direction as to close the metering valve 23. A control lever 100 is provided in the casing and has one end, designated at 101, bearing against a boss 96' on the underside of the lever 96 and its other end is engaged by a pointed projection 102 of a thermostatic responsive element or bulb 103, which depends from the overhung end of the control unit. Intermediate its ends the control lever 100 is rockably mounted or fulcrumed on projections 104 carried at the outer end of a fulcrum lever 105 pivotally supported on the fulcrum pin 97 and controlled as to their position by an adjusting screw 106 rotatably mounted in a threaded bearing 107 provided therefor in the casing and conveniently manipulated by means of an adjusting knob 108. The lower end of the screw 106 is rounded and bears on the lever 105 just above its projections 104. A spring 109 is interposed between the bottom wall 95 of the control unit and the overlying portion of the control lever 100 to cause the parts to maintain their operative relationship and to follow the movement one of the other.

When the thermostatic control unit is assembled with the constant level device, bosses on the unit interfit with recesses in the cover frame to insure alinement.

A knob controlled shut-off plunger designated at 110 similar in construction and action to the corresponding shut-off plunger fully described in the application of Roy W. Johnson and Herbert M. Reeves filed September 20, 1937, Serial No. 164,792, for "Interchangeable control valves," is provided and is combined with the metering valve to positively and fully shut the same off when desired.

When the thermostatic control is in operation the shut-off plunger 110 is latched in inoperative position. By virtue of the special organization of the control and shut-off levers shown in Figure 7 only a very small movement of the thermostatic element is necessary to change the metering valve from high to low fire. As the temperature of the air passing the thermostatic element 103 changes, the thermostatic element will cause the metering valve stem to move, permitting more or less oil to flow to the burner so as to maintain a uniform temperature of the space heated. Operation is entirely automatic. Once the control knob 108 has been set to give the desired comfortable temperature no further adjustment is necessary. However, the flow of the oil can be cut off simply by manipulating the cut-off plunger 110, allowing it to drop under the influence of the spring and punch the metering valve closed. A wide range of operating temperatures is available and in the construction and design shown the temperatures maintained may be varied between 35° and 90° F. The lever 96 not only overlaps the valve but also overlaps the lug 68 so that the low fire adjustment is maintained as before. Within the casing 10 the same high fire adjustment is provided as in the device which is manually controlled.

While I have shown and described typical constructions in which the invention may be embodied it is to be understood that these constructions have been selected merely for the purpose of illustration or example and that various changes in the size, shape and arrangement of the parts may be made without departing from the spirit of the invention or the scope of the subjoined claims.

The invention claimed is:

1. An oil control device of the character described comprising a casing having a liquid supply chamber provided with an outlet passage, a tubular valve guide having its lower end connected with the outlet passage, said valve guide having an internal valve seat adjacent its lower end and being provided with a lateral opening above said valve seat to provide for communication between the liquid supply chamber and the interior of the guide, a metering valve cooperable with the valve seat and having its lower end guided by the lower end of said tubular valve guide, cooperating guide means between the upper portion of the tubular valve guide and the valve for constraining the valve to movement longitudinally toward and away from its seat, and means for moving the valve longitudinally.

2. An oil control device of the character described comprising a casing having a liquid supply chamber provided with an outlet passage, a tubular valve guide having its lower end connected to the outlet passage, said valve guide having an internal valve seat adjacent its lower end and being provided with a lateral opening above said valve seat to provide for communication between the liquid supply chamber and the interior of the guide, a metering valve cooperable with the valve seat and having its lower end portion in guiding engagement with a portion of the tubular valve guide below said seat, said valve guide having a longitudinally extending guide slot in its upper portion, a guide pin secured to the valve, projecting laterally therefrom, and slidably interfitted with said valve slide, and means for moving the valve longitudinally.

3. A control device of the character described comprising a casing having a liquid supply chamber provided with an outlet, a tube having one end connected to the outlet and provided with an internal valve seat, a metering valve slidable in the tube and cooperable with the valve seat, means on one side of the valve seat for constraining the valve to longitudinal movement in the tube, said tube having a longitudinal slot on the opposite side of said valve seat, a pin fixed to the valve and slidably fitted in said slot to constrain the valve to movement axially of the tube, said tube having an opening affording communication between the liquid supply chamber and its interior, and means for adjusting the valve longitudinally.

4. A control device of the character described comprising a casing having a liquid supply chamber provided with an outlet, a tube having one end connected to the outlet and provided with an internal valve seat, a metering valve slidable in the tube and cooperable with the valve seat, said tube having an opening affording communication between the liquid supply chamber and its interior, cooperating means between the tube and valve for constraining the valve to longitudinal movement, and means for adjusting the valve longitudinally.

5. An oil control device of the character described comprising a casing having a liquid supply chamber provided with an outlet, a cover for the casing having an opertured portion overlying the outlet, an outlet valve cooperable with the outlet, a spring for biasing the valve to open position, manually operable means for closing the valve and comprising a knob, a bracket secured to the cover of the casing and having an opening registering with the opening thereof, a sleeve structure secured to the knob and extending down through the opening in the bracket and cover and shiftable vertically with respect to the cover and bracket, spring means between the sleeve structure and the cover for biasing the same downwardly, a cam secured to the sleeve structure and having an active cam portion surrounding the same, and an abutment supported on the cover and with which said cam portion coacts whereby upon turning of the knob the cam will be shifted vertically with respect to the cover, and means movable with the cam and engageable with the upper end of the outlet valve so that adjustment of the cam regulates the position of the valve.

6. An oil control device of the character described comprising a casing having a liquid supply chamber provided with an outlet, an outlet valve regulating flow through the outlet and biased to open position, a knob rotatably supported on the casing and having a sleeve structure depending therefrom and surrounding the upper end of the valve, a spring cooperable with the sleeve structure to bias it and the knob downwardly, a spring steel cam secured to the sleeve structure and having a resilient portion surrounding the same, means carried by the knob for determining the position of said resilient portion, means on the casing on which said resilient portion rides, and means connected with the cam and engaged with the valve whereby turning of the knob and consequent adjustment of the cam regulates the position of the outlet valve.

7. An oil control device of the character described comprising a casing having a liquid supply chamber provided with an outlet passageway, a tubular valve guide having its lower end fitted in and secured to the wall of the passageway, said valve guide having an internal valve seat adjacent its lower end and being provided with a lateral opening affording communication between its interior and the liquid supply chamber, an outlet valve having its lower end cooperable with the valve seat, said casing having a top provided with an opening overlying the outlet valve, a bracket secured to the top and having an opening registering with the opening thereof, a knob rotatably interfitted with the bracket and having a depending sleeve structure telescoped over the upper end of the valve guide, spring means between the top and the sleeve structure for biasing the same downwardly, a cam disk fixed to the sleeve structure and having a circumferentially extending slot adjacent its periphery to provide an adjustable and active cam portion, means on the knob for controlling the position of said active cam portion, and an abutment secured to the casing and on which the active cam portion rides, the central portion of the cam engaging the upper end of the outlet valve whereby turning of the knob regulates the position of the valve.

8. An oil control device of the character described comprising a casing having a liquid supply chamber provided with an outlet passageway, a tubular valve guide having its lower end fitted in and secured to the wall of the passageway, said valve guide having an internal valve seat adjacent its lower end and being provided with a lateral opening affording communication between its interior and the liquid supply chamber, an outlet valve having its lower end cooperable with the valve seat, said casing having a top provided with an opening overlying the outlet valve, a bracket secured to the top and having an opening registering with the opening thereof, a knob rotatably interfitted with the bracket and having a depending sleeve structure telescoped over the upper end of the valve guide, spring means between the top and the sleeve structure for biasing the same downwardly, a cam disk fixed to the sleeve structure, and an abutment secured to the casing and on which the cam rides, and means movable with the cam and engageable with said valve to control its position.

9. A control device of the character described comprising a casing having a liquid supply chamber provided with an outlet, a tubular guide having one end connected with the outlet and provided with an internal valve seat, a metering valve cooperable with the valve seat, means for constraining the metering valve to longitudinal movement, a rotary control knob, a sleeve structure fixed to the knob and loosely telescoped over said tube, means for supporting the knob and sleeve structure for rotation, a cam fixed to the sleeve structure and engageable with the valve for moving the same in one direction, and means for biasing the valve to move in an opposite direction.

10. An oil control device of the character described comprising a casing having a liquid supply chamber provided with an outlet, a tubular guide connected to the outlet and provided with an internal valve seat, a metering valve cooperable with the valve seat, means for biasing the valve to open position, means for constraining the valve to longitudinal movement, a rotary control knob, a sleeve structure fixed to the knob and loosely telescoped over the tubular guide, a cam fixed to the sleeve structure, an abutment supported in fixed position and on which the cam rides, means movable with the cam and engageable with the valve to control its position, and yieldable means for maintaining said last mentioned means in engagement with the valve.

11. A control device of the character described comprising a casing having a liquid supply chamber provided with an outlet, a metering valve for regulating flow through the outlet, means for biasing the metering valve to open position, a manual control for controlling the position of the valve and comprising a disk having a curved slot adjacent its periphery and extending out through a portion thereof to provide a flexible cam strip, means for adjusting the cam strip to vary the rise of the cam, means for supporting and rotating the cam and means connecting the cam to the valve whereby to vary the position of the valve.

12. An oil control device of the character described comprising a casing having a liquid supply chamber provided with an outlet, a metering valve for regulating flow through the outlet, means for biasing the valve to open position, a rotary control knob supported on the casing for rotation and for axial shifting movement, a cam disk connected to the control knob and movable therewith and provided with a flexible portion, a fixed abutment on which said flexible portion rides, means carried by the knob for flexing said portion to vary the rise of the cam, and means movable with the cam and cooperable with the valve to control its position.

13. An oil control device of the character described comprising a casing having a liquid supply chamber provided with an outlet, a tubular valve guide having its lower end connected to the outlet and provided with an internal valve seat, a metering valve cooperable with said seat to regulate flow through the outlet, a rotary control knob, a sleeve structure fixed to the knob and telescoped loosely over said tubular guide, a bracket plate fixed to the casing and having an opening through which said sleeve structure extends, a cam disk fixed to the sleeve structure, an abutment fixed to the casing and on which said cam disk rides, and a spring interposed between the lower end of the sleeve structure and the bracket plate for urging the cam disk into engagement with its abutment and having means constrained to move with the cam disk and sleeve structure and cooperable with the valve whereby upon rotation of the knob the valve is adjusted longitudinally.

14. An oil control device of the character described comprising a casing having a liquid supply chamber provided with an outlet, a metering valve for regulating flow through the outlet, means for constraining the metering valve to longitudinal movement, means for adjusting the valve longitudinally, and means for limiting the opening movement of the valve and comprising a projection on the valve, a stop cooperable with the projection, and means for adjusting the stop comprising a pair of adjustably interfitted parts, means for securing the parts in adjusted position and means on the casing cooperable with one of the parts for limiting its movement in one direction.

15. An oil control device of the character described comprising a casing having a liquid supply chamber provided with an outlet, a metering valve for regulating flow through the outlet, means for constraining the metering valve to longitudinal movement, means for moving the valve longitudinally, and means for limiting the opening movement of the valve comprising a projection extending laterally from the valve, a stop pin cooperable with the projection, a guide in which said stop pin is slidably fitted, a spring for urging the stop pin in one direction, a sleeve threadedly interconnected with the casing and having a flange cooperable with the stop pin for shifting the same against the action of its spring, a stop screw interthreaded with the sleeve and cooperable with the casing for limiting the movement of the sleeve in one direction, and means for securing the stop screw and sleeve in adjusted position.

16. An oil control device of the character described comprising a casing having a liquid supply chamber provided with an outlet, a metering valve for regulating flow through said outlet, means for constraining the metering valve to longitudinal movement, means for biasing the metering valve to open position, a rotary cam cooperable with the valve for controlling the position thereof, and an abutment on which said cam rides, said abutment including a flexible strip having one end shiftably supported on the casing, and adjustable means for flexing said strip.

17. A control device of the character described comprising a casing having a liquid supply chamber provided with an outlet, a metering valve for regulating flow through the outlet, means for biasing the valve to open position, means for limiting the opening movement of the valve, and means for moving the valve toward its closed position against the action of its biasing means and comprising a rotary knob, a cam connected to the knob and rotatable therewith, an abutment on which the cam rides, spring means for urging the cam toward its abutment, and means moving with the cam and engageable with the valve for shifting the same toward closed position.

18. A control device of the character described comprising a liquid casing having a liquid supply chamber provided with an outlet, a metering valve for regulating flow through the outlet, means for biasing the valve to open position, means for limiting opening movement of the valve, an adjustable abutment supported on the casing, a rotatable knob, a cam carried by the knob and riding on the abutment, means on the knob coacting with the cam for adjusting the rise thereof, a sleeve depending from the knob and having a flanged lower end, and a spring interposed between the flange and the casing for pressing the cam against its abutment, and a part carried by the cam and knob and engageable with the valve for shifting the same toward and away from its seat as the knob and cam are rotated.

19. A control device of the character described comprising a casing having a liquid supply chamber provided with an outlet, a metering valve regulating flow through the outlet, and means for biasing the valve to open position, means for limiting the opening movement of the valve including an adjustable stop pin engageable with a part of the valve, a screw for adjusting said stop pin and means for limiting the extent to which the screw may be moved.

20. A control device of the character described comprising a casing having a liquid supply chamber provided with an outlet, a metering valve regulating flow through the outlet, and means for biasing the valve to open position, means for limiting the opening movement of the valve including an adjustable stop pin engageable with a part of the valve, a screw for adjusting said stop pin, a second screw interconnecting the first named screw and cooperable with the casing to limit the movement of the first screw, and means for soldering said screws together.

21. A control device of the character described comprising a casing having a liquid supply chamber provided with an outlet, a metering valve for regulating flow through the outlet, means for biasing the valve to open position, a rotary cam comprising a metal disk having a curved strip cut therefrom, a knob connected to the disk, a screw threaded to the knob and engaged with the curved strip to depress the same, and means supporting the cam for rotation and for causing it to press against the valve.

22. A control device of the character described comprising a casing having a liquid supply chamber provided with an outlet, a metering valve for regulating flow through the outlet, means for biasing the valve to open position, an abutment adjustably supported on the casing, a cam engageable with the valve and having its active cam surface riding on the abutment, means for turning the cam, and means for causing the cam to press against the abutment and the valve.

ROY W. JOHNSON.